United States Patent [19]
Melrose et al.

[11] 3,727,865
[45] Apr. 17, 1973

[54] SUSPENSION SYSTEM

[75] Inventors: David Robert Melrose; Derek Sidney Binge, both of Hamilton Square, N.J.

[73] Assignee: RCA Corporation, New York, N.Y.

[22] Filed: Oct. 9, 1970

[21] Appl. No.: 79,496

[52] U.S. Cl.................................248/15, 248/358 R
[51] Int. Cl..............................................F16l 15/04
[58] Field of Search....................248/15, 22, 20, 18, 248/358 R; 267/160, 153; 350/287, 310, 318

[56] References Cited

UNITED STATES PATENTS

| | | | |
|---|---|---|---|
| 2,457,425 | 12/1948 | Wolfard | 248/20 |
| 3,204,943 | 9/1965 | Kerley | 248/358 A X |
| 3,204,897 | 9/1965 | Lawrence | 248/20 X |
| 3,351,307 | 11/1967 | Michel et al. | 248/358 A X |
| 3,371,895 | 3/1968 | Speranza | 248/20 |
| 3,596,865 | 8/1971 | Camossi | 248/358 A |
| 1,377,556 | 5/1921 | Bridgman | 248/20 |
| 1,704,570 | 3/1929 | Lee et al. | 248/358 R |
| 2,404,799 | 7/1946 | Harry et al. | 248/358 UX |
| 3,295,808 | 1/1967 | Webb | 267/160 X |
| 2,415,983 | 2/1947 | Yerzley | 248/18 |
| 3,204,911 | 9/1965 | Lawrence et al. | 248/18 UX |
| 3,549,244 | 1/1969 | Shaffer | 350/287 |
| 3,246,890 | 4/1966 | Ormond | 248/358 R X |
| 3,093,367 | 6/1963 | Hawkins et al. | 267/153 |

FOREIGN PATENTS OR APPLICATIONS

| | | | |
|---|---|---|---|
| 88,453 | 1/1967 | France | 248/358 A |

Primary Examiner—J. Franklin Foss
Attorney—Edward J. Norton

[57] ABSTRACT

A rigid member having six degrees of freedom in a system in which the member is suspended from a support by a plurality of webs (preferably four or more) arranged to develop restoring stresses in the webs in response to any disturbing force or torque to restore the member to its equilibrium position. The properties of the webs may be selected to provide a wide range of system spring stiffness for use in an environment of significantly improved thermal isolation.

28 Claims, 25 Drawing Figures

INVENTORS
David R. Melrose &
Derek S. Binge
BY
ATTORNEY

INVENTORS
David R. Melrose &
Derek S. Binge

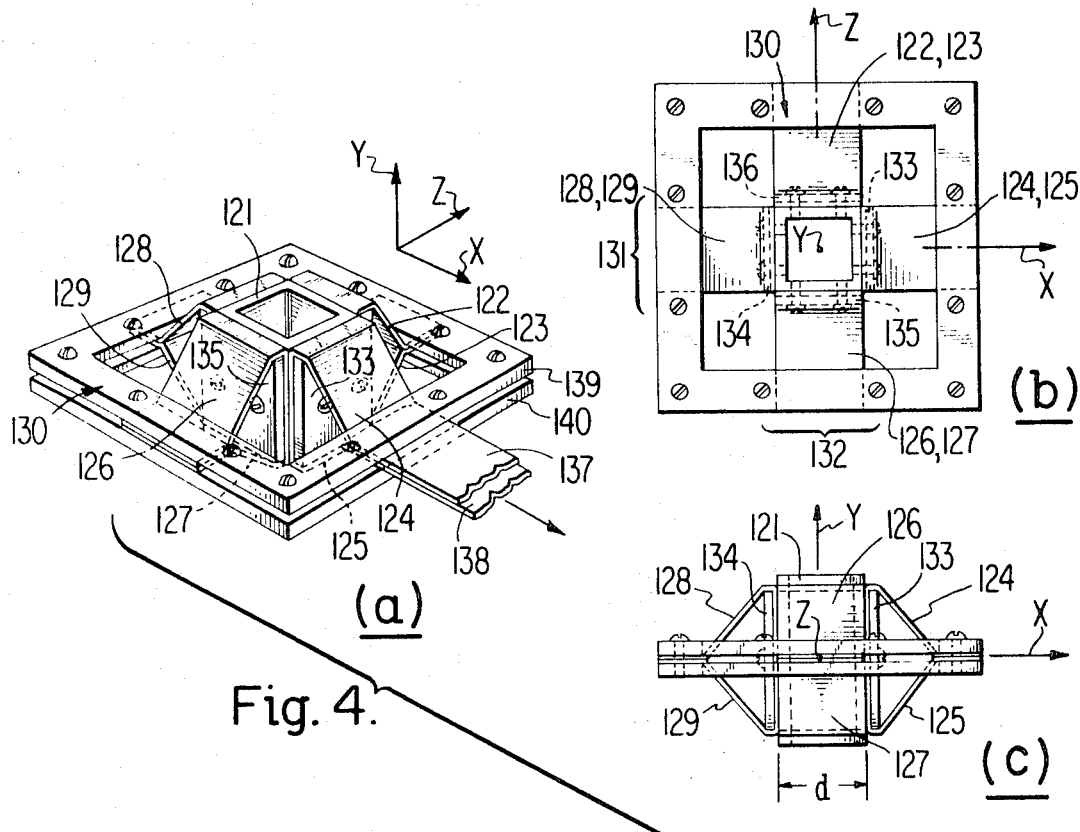
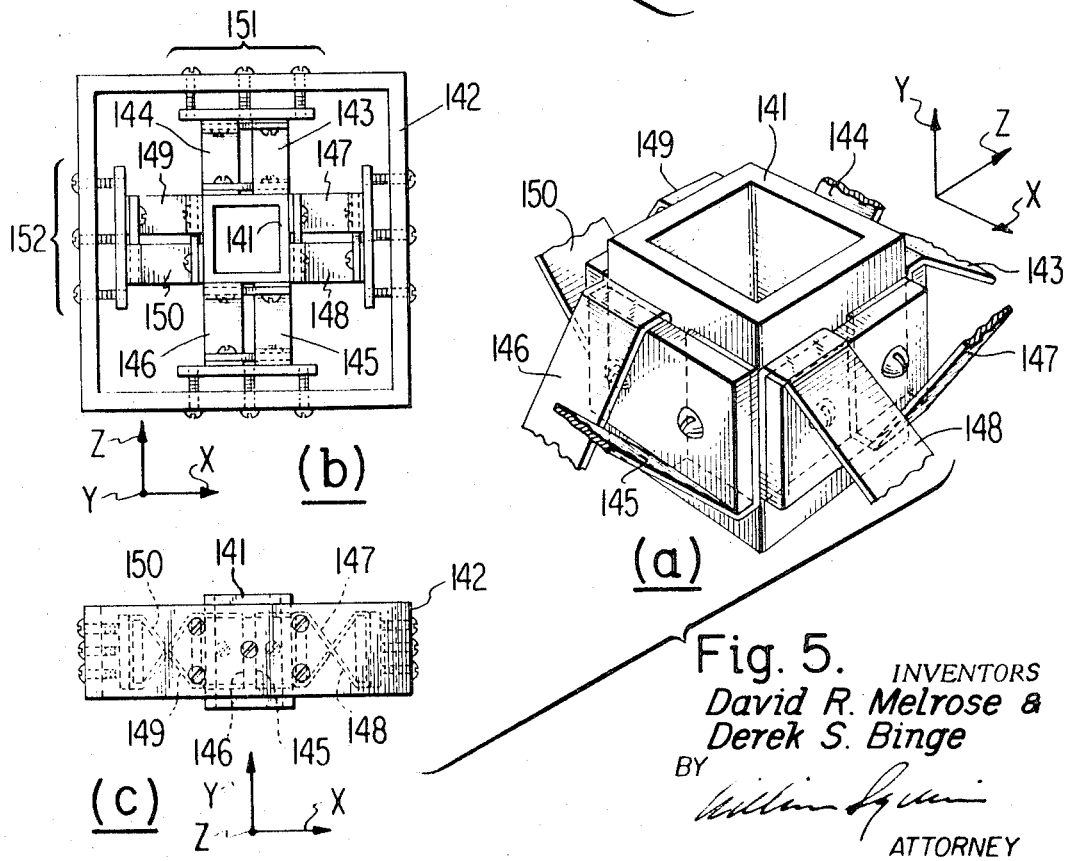
Fig. 4.
Fig. 5.
INVENTORS
David R. Melrose &
Derek S. Binge
BY
ATTORNEY INVENTORS
David R. Melrose &
Derek S. Binge

SUSPENSION SYSTEM

BACKGROUND OF THE INVENTION

This invention relates to suspension systems.

In certain applications, such as in the use of infrared detectors, optical equipment superconductive materials, gyroscopes, low noise circuits, masers, or sensitive components, so-called stiff mountings are required which are dimensionally stable at cryogenic temperatures. Usually such mountings are provided by spacers or isolators made of thermally insulating material. However, not every application is suitable for such mountings due to design configurations, mounting plate design requirements, and other considerations. For example, in an optical system employing infrared detectors operative at cryogenic temperatures as used in space applications, the optics are mounted on a support plate which requires stiff suspension which at the same time meets the thermal isolation requirements. To provide this mechanical and thermal isolation, the construction using prior art isolators also permits undesirable bending of the support plate (due to bending of the isolators) during launch of the space vehicle due to extreme load conditions if not otherwise prevented by caging. Further, the low cryogenic temperatures of the mounted components are difficult to maintain due to the thermal conduction of heat by the prior art spacers to the components from the supporting structure.

To provide relatively stiff equilibrium, that is, to provide a high natural frequency system, especially in optical systems, numerous spacers may be employed, the spacers being solid masses, rigid and closely spaced to one another. However, it is the solid mass and large number of spacers used which results in undesirable thermal conductivity. In addition, solid isolators made of common thermal material such as many types of plastics or rubber generally have a tendency to creep under load and also may experience stress relaxation, both effects tending to cause failure of the spacers or at least upset the precision of the mounting system.

Conventional spring-like suspension systems are generally of low natural frequency and are not sufficiently stiff for the applications described, especially in an optical system requiring substantial stiffness characterized by a mechanical resonant frequency of several hundred hertz. In any suspension system, vibration of the supporting structure at a frequency below the system natural frequency will cause the suspended mass to closely follow the motion of the supporting structure. However, at a frequency above the system natural frequency, the suspended mass will be vibration isolated, and when the support vibrates at the natural system frequency or at the resonant frequency, the suspended mass will vibrate at large amplitudes. Also, any disturbing force or torque on the suspended mass or suspension members would tend to displace the mass and cause vibrations thereof whose amplitude is a function of the system stiffness.

To provide a suspension system of adequate stiffness for the applications described would require greatly increased spring masses to increase the natural frequency to a point where the vibration amplitudes thereof would be relatively small and all anticipated input frequencies are below the system natural frequency. Such increased spring masses are accompanied by increased weight and bulkiness as well as increased thermal conductivity. Consequently, any attempt to increase the natural frequency of prior art suspension systems would result in undesirable thermal or vibration properties which would limit the performance of a sensitive suspended member. Most prior art suspension systems have too low a natural frequency, are too soft or spongy for optical use, and the materials used exhibit mechanical hysteresis, which upsets the precision of the mounting system.

Therefore it is an object of the present invention to provide a suspension system which overcomes the above disadvantages.

It is a further object to provide a suspension system having little hysteresis, good thermal isolation capability, and a wide range of high natural frequencies, which system is sufficiently stiff for optical applications.

SUMMARY OF THE INVENTION

In the system of the present invention in which a rigid member is suspended from a support, a plurality of strips of pliable sheet-like material are each anchored at predetermined positions on the support and at predetermined positions on the member for suspending the member in an equilibrium position such that the strips are each planar when the member is in the equilibrium position. The strip material has the property that any tendency to elongate any of the strips provides a restoring stress in that strip.

The strips, support, and member are spatially arranged with respect to each other to produce a restoring stress in at least one of the strips in response to a disturbing torque tending to rotate the member with respect to the equilibrium position about an axis oriented at any angle. Also, the spatial arrangement is such as to produce a restoring stress in at least one of the strips in response to a disturbing force tending to translate the member in a direction oriented at any angle.

IN THE DRAWINGS

FIGS. 1a–1d are various schematic views of an embodiment of the present invention useful for illustrating the principles thereof, FIG. 1a being a perspective view and FIGS. 1b–1d being end, plan and side views, respectively.

FIGS. 2a–c are various views of a preferred embodiment of the present invention in which FIG. 2a is a perspective cutaway view, FIG. 2b is an end view and FIG. 2c is a plan view.

FIGS. 3a–c are various views of still another arrangement in which FIG. 3a is a cutaway perspective view, and FIGS. 2b–c are end and plan views, respectively, the webs being shown therein in similar arrangement as in FIG. 1.

FIGS. 4a–c illustrate an arrangement of webs for suspending a cubic member from annular support.

FIG. 5a–c illustrates a perspective, plan and end views respectively of an arrangement of the webs using a combination of the arrangements of FIGS. 2 and 4.

FIG. 6a–c shows perspective, plan, and end views respectively of another embodiment of the present invention.

FIG. 7a–b illustrates a partial perspective and a plan view of an arrangement which is a variation of the embodiment of FIG. 4.

FIGS. 8–11 each show a plan view of other arrangements for suspending a member from a support structure, the plane and anchorage positions of the webs therein being rotated 90° with respect to their orientation in the previous figures, the embodiment of FIG. 8 being related to that of FIG. 5, the embodiment of FIG. 9 being related to the embodiment of FIGS. 5 and 6, the embodiment of FIG. 10 being related to that of FIG. 4, and the embodiment of FIG. 11 being related to that of FIG. 6.

DETAILED DESCRIPTION

Figure 1:
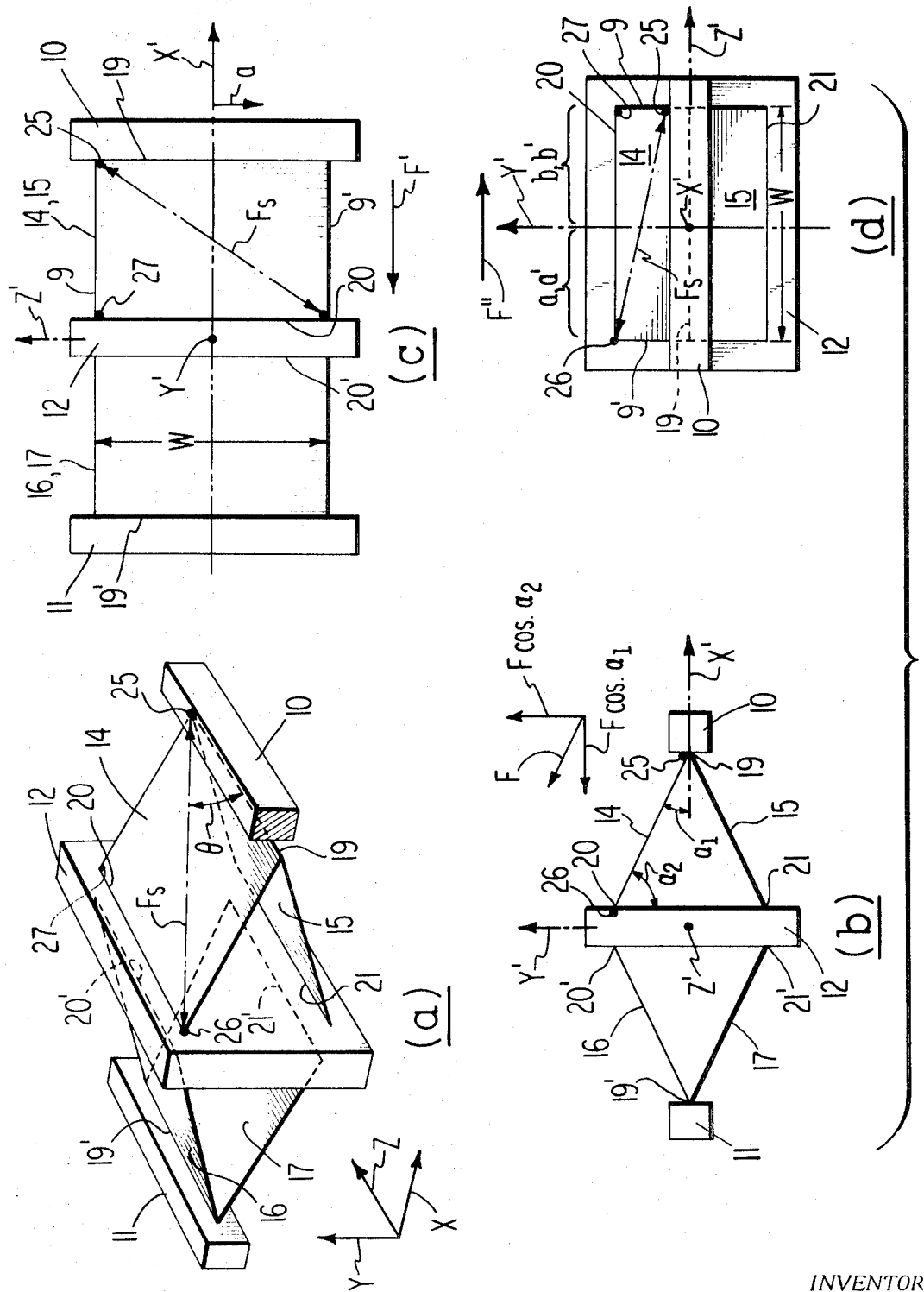

In FIGS. 1a to 1d, two spatially separated supporting structures 10 and 11 are secured to means (not shown) for suspending member 12 therebetween at an equilibrium position in a spring system having six degrees of freedom. Member 12 is suspended from supports 10 and 11 by thin, pliable, elastic webs 14, 15, 16 and 17 which are substantially planar when member 12 is in the equilibrium position. The arrangement of the supports, webs and suspended member is such that regardless of the direction or angle of a disturbing force or torque applied to any or all of the supports, webs, and suspended member, equal and opposite restoring forces or torques are produced in the webs which tend to maintain the equilibrium position of member 12 in a manner to be described.

The arrangement of the webs is such that regardless of the direction of the forces applied to suspended member 12, the webs, both individually and collectively, provide restoring forces in a three dimensional coordinate system, while at the same time the webs may be bent, warped, folded or the like due to the displacement of member 12 from its equilibrium position. The elastic property of the webs or strips 14–17 provides the restoring forces while the pliable property permits the webs or strips to bend, warp, or fold without producing further forces which substantially detract from the restoring forces provided by the elongation of the webs.

The elastic property is one which is associated with tension as will be appreciated, the webs or strips 14–17 inclusive, as described herein, being tension members. The thin, planar, pliable properties of the webs or strips are such that compressive forces on the webs in the direction parallel to the plane of the webs may cause the webs to fold, bend, warp, collapse while the characteristic of the material as a solid, three dimensional, non-planar mass may, on the contrary, support compressive forces. For example, a cube of steel would not be pliable in the sense described herein whereas the same cube, if rolled out into a thin sheet or foil, would be pliable.

In the embodiment of the present invention, the desired suspension characteristics are derived by so arranging the tension members (webs 14–17, inclusive) that within certain prescribed load limits, displacement in any direction of suspended member 12 causes tensile elongation of one or more of the webs 14–17, inclusive, within the elastic limits of the web or webs. This elongation is purely elastic and provides the restoring forces which tend to maintain the suspended member in its equilibrium position and at the same time gives the system its spring-like characteristics.

The stiffness of any spring system is defined by its spring constant K which is the unit of force per unit of displacement due to that force. In the present invention, the spring constant K may be increased by prestressing the webs or by selectively using materials as webs which are inherently stiff, that is, have a high modulus of elasticity, the higher the modulus of elasticity, the stiffer the system for a given equilibrium stress in the webs. By both prestressing and by selecting relatively stiff web materials, even stiffer spring systems can be provided for a given material. The prestressing adds to the system stiffness by providing balanced torques and translational force components which tend to maintain the suspended member in its equilibrium position.

The webs or strips 14–17, inclusive, are each planar, as indicated above, when the system is at rest. When member 12 is displaced from its equilibrium position, it is displaced with respect to supports 10 and 11. This displacement may cause the webs to distort from the planar condition. This distortion may be a folding, bending, warping or any combination thereof. But due to the thin planar construction of the webs, substantially little resistance is offered thereby to the folding, bending, warping or the like so that the only appreciable stresses induced in the webs are solely due to tensile elongation. As long as these relationships are substantially maintained, (no significant stresses other than tensile regardless of the displacement of member 12), then the system will continue to exhibit spring-like behavior. It will be appreciated that where forces are present due to the bending or folding of the webs, these forces may be utilized to enhance the restoring force symmetry of the suspension system.

In FIGS. 1a–1b, inclusive, supports 10 and 11 are illustrated as rigid elongated rectangular bars. Rigid rectangular planar member 12, like supports 10 and 11, may be any shape as long as it does not substantially flex, warp or otherwise distort when stressed in the suspended state and is so dimensioned to provide spaced anchorage positions thereon for the webs.

The apparatus of FIGS. 1a, 1b, 1c and 1d may be placed in a three dimensional cartesian coordinate system having $x$, $y$ and $z$ coordinates as shown in FIG. 1a. Webs 14 and 15 are connected at common anchorage position 19 on support 10 and at spaced anchorage positions 20 and 21 on member 12. Anchorage positions 20 and 21 are spaced from each other in the $y$ direction. Similarly, webs 16 and 17 are connected at common anchorage position 19' on support 11 and at spaced anchorage positions 20' and 21' on member 12. Anchorage positions 20' and 21' are also spaced from each other in the $y$ direction.

Anchorage positions 19, 20, 21, 19', 20' and 21' are in this case, all substantially parallel to the $z$ axis. Anchorage positions 20 and 21 are spaced from each other the same given distance in the $y$ direction as are positions 20' and 21' and are respectively opposite each other in the $x$ and $z$ direction forming a diamond shaped configuration of which member 12 is a diagonal (see FIG. 1b).

Webs 14–17, inclusive, may be made of any material which meets the criteria outlined above including being (1) pliable (2) in sheet form and (3) having elasticity while being subjected to tensile forces. Such materials include metals, plastics, paper and rubber. It will be appreciated that most solid materials are elastic to some degree. Material such as paper, not commonly known for the property of elasticity, possesses a degree of elasticity sufficient for providing a structure in accordance with the present invention. Many other materials, not generally known for the property of elasticity, also may be similarly utilized. However, with respect to providing a suspension system having substantially effective force restoring symmetry, i.e. six degrees of freedom, the above criteria relate to the tensile modulus of elasticity parameter of the webbing. Other parameters of the webbing which relate to the system force restoring symmetry include the web width $w$, the angular orientation of a web relative to the other webs, the spaced arrangement of a web with respect to the other webs, and the degree of prestressing imposed on each web. It is to be understood that the web width parameter refers to that width dimension which is effective to provide the desired restoring forces, the web not necessarily being rectangular in shape as illustrated. It will be appreciated that selection of the web parameters is a function of the environment to which the system is to be subjected. By so selecting these parameters system natural frequencies of 400 Hz or higher may be provided, which frequencies are desirable for optical or infrared equipment.

In the structure of FIGS. 1a–1d, inclusive, a symmetrical geometric arrangement with respect to suspended member 12 is shown. The size, material and thickness of the webs are substantially the same. Webs 14 and 15 form an equalateral triangular prism with member 12 as the base, and anchor position 19 as the apex. The orientation of webs 16 and 17 is a mirror image of the orientation of webs 14 and 15. Support 10 and 11 are parallel and coplanar with member 12 disposed therebetween. The symmetrical arrangement of the embodiment of FIG. 1 is presented for purposes of clarity of illustration. It will be appreciated that geometric assymetry may also be utilized.

The geometric arrangement of the webs with respect to the suspended member, whether symmetrical or assymetrical, in any case, is such that substantially effective force restoring symmetry is provided on member 12. The term "force restoring symmetry" as herein employed means that the system has spherical force restoring symmetry, i.e. six degrees of freedom; i.e., regardless of the orientation of a disturbing torque or force applied to any component or portion of the system, suspended member 12 will tend to be maintained in the desired equilibrium position by a restoring force in a direction opposite to the direction of the disturbing torque or force.

Description of the relationship between the arrangement of FIGS. 1a, 1b, 1c and 1d and restoring force symmetry will now be shown. The following description is divided into two areas. First, the manner of providing restoring force components in each web in two directions of a three coordinate system, and then, in the more complex arrangement of providing restoring force components in the three coordinates.

In the former instance webs 14, 15, 16 and 17 are arranged to provide a restoring torque to member 12 in response to a disturbing torque tending to displace member 12 in any direction about the $z'$ axis in the $x$–$y$ plane. This restoring torque is provided by spatially arranging the webs to provide equal and opposite torque couples about the $z$ axis. At the same time, the angular relationship of the webs to each other and to the $x$ and $y$ axes provides restoring forces in response to translational disturbing forces. Thus, as seen in FIG. 1b, webs 14 and 17 provide a clockwise torque coupled about axes $z'$ while webs 15 and 16 provide an opposite torque couple. Therefore each web is angularly and spatially disposed to provide a restoring force or torque in any direction in the $x$–$y$ plane. Since each of webs 14–17 inclusive, are planar structures then such restoring forces are provided by disposing each web at an angle $\alpha$ to each of the $x$–$y$ axes. Any restoring stress in that web will have $x$ and $y$ force components equal to F cos $\alpha$, where $\alpha$ is the angle of the web to that coordinate in which the component is computed.

In FIG. 1b, F cos $\alpha_1$, is the $x$ force component and F cos $\alpha_2$ is the $y$ force component, the maximum force component in both coordinates from a single web arising when $\alpha$ is 45°. It is clear that the greater the force components desired in a particular coordinate, the smaller the angle $\alpha$. The arrangement of the webs of FIG. 1a–1d, inclusive, is but one of a plurality of different arrangements, as will be described.

In any of these arrangements, at least two webs or strips of predetermined width are disposed at spaced anchorage positions on each of at least two sides of a rigid suspended member. The two webs depend from spaced positions on the suspended member to common or separate anchorage positions on a rigid support structure which support positions define the location of at least two planes between which the suspended member is disposed. As shown, webs 14 and 15 converge at common anchorage position 19 on support 10, which position defines the location of a first $y$–$z$ plane. Webs 16 and 17 converge at a common anchorage position 19′ on support 11, which position defines the location of a second $y$–$z$ plane. Member 12 is suspended between the first and second $y$–$z$ planes. The disposition of the anchorage positions on the supporting structure define the location of at least two planes between which a member is suspended, the anchorage positions preferably being linear or lying in a given plane.

In the arrangement of FIGS. 1a–1d inclusive, any force or torque tending to collapse any of the webs or combination thereof sets up a restoring stress in another of the web or webs. For example, a clockwise rotational torque or component thereof about the $z'$ axis parallel to the $z$ coordinate in FIG. 1b sets up a restoring torque in webs 15 and 16 in the opposite direction. A translational force or component thereof in the $x$ or $y$ direction tends to set up an equal and opposite translational restoring force in webs 16 and 17. These restoring forces are set up in a web or webs due to the tendency of the web or webs to be elongated in tension when the disturbing loads noted above are transmitted to member 12. The extent to which member 12 is displaced by any given force or torque applied thereto is a function of the cross sectional area and modulus of elasticity of the webbing. However, by prestressing the webs, additional stiffness may be provided due to the force components contributed by the prestressing in the $x$–$y$ plane.

So far the above discussion has been limited to the $x$–$y$ plane, and as such, the relationships present in only FIG. 1b were pertinent. But to extend the system into the third coordinate, the z axis, reference will now be made to FIGS. 1c and 1d. Digressing for a moment back to FIG. 1b, all rotational and translational motions were limited to the x–y plane, and in that sense webs 14–17 inclusive, would work equally as well if they were strings or filaments. On the other hand, any force or torque along the z axis or about the x and y axis, would tend to both translate or rotate, as the case may be, the structure in the z–y plane if strings or wires were used. With strings or wires, member 12 would tend to translate in the z direction regardless of the stiffness of the system in the x–y plane, also member 12 would tend to rotate about the x axis. Motions in the z direction or about the x or y axis tend to cause proportionately less elongation of the strings or wires; therefore, unless otherwise provided for, strings or wires in the configuration of FIG. 1b do not lend themselves to effective force restoring symmetry.

Returning to FIGS. 1c and 1d, a plan view and side view of the embodiment of FIG. 1b, respectively, webs 14–17 inclusive, are shown having a predetermined width w in the z direction. In particular, this width is a determining factor for providing restoring forces in the z direction both with respect to providing equal and opposite restoring torques along an axis parallel to the x and y coordinates and to providing equal and opposite restoring translational forces parallel to the z coordinate.

To prevent rotation of member 12 about an axis parallel to the y coordinate, a predetermined width $w_1$ is selected in a manner to be explained for webs 14–17 parallel to the direction of the z coordinate. In FIG. 1c, y' is arbitrarily chosen as such an axis. For a given width of webs 14–17, it is known that an increment of stress in the webs decreases as the displacement of the stress increment increases from a torque axis such as y'. This relationship is given approximately as follows:

$$\delta S = \frac{T}{\frac{ta^2}{2}} \quad (1)$$

where:

$\delta S$ is increment of stress in a web;
$a$ is distance of $\delta S$ from torque axis;
$T$ is disturbing torque; and
$t$ is thickness of the web and where:

$$S = E\epsilon = E\,\delta l/l \quad (2)$$

where:

$S$ is the stress, PSI;
$E$ is the Young's modulus, LB/in$^2$ per in per in;
$\epsilon$ is the strain, in/in;
$l$ is the length of the web; and
$\delta l$ is the elongation of the web when stressed.

By choosing a point 26 on web 17 furtherest from y' in the z direction normal to the restoring force components in web 14 in the x direction, it is clear from equation (1) that while point 26 tends to rotate the greatest increment per unit of rotation of member 12 about y' as compared with any other point on web 14 in the z direction (greatest $\delta$), point 26 is also subject to the least stress for a given applied disturbing torque, for point 26 has the greatest ($a$). Since increasing the width both reduces the relative stress at a web edge such as either of edges 9 and 9' of web 14, while at the same time requires a greater elongation at such an edge per unit of rotation of member 12, then the stiffness of the system may be increased by increasing the web width in the z direction. Thus, the predetermined width $w_1$ is calculable from the above. Of course, a plurality of webs of narrower width than the predetermined width $w_1$ may be disposed in spaced relationship along the Z coordinate to give the same net effect as width $w_1$ in a manner to be described in conjunction with FIGS. 2a, 2b and 2c. It is to be understood that edges 9 and 9' represent the effective web width for webs having non-rectangular shapes.

To prevent rotation of member 12 about an axis parallel to the x coordinate, a predetermined width $w_2$ is selected for webs 14–17 inclusive, in the direction in the z coordinate. In FIG. 1d, x' is arbitrarily chosen as such an axis for illustration. As will be described in conjunction with FIG. 2, a plurality of webs spaced in the z direction may be substituted for the single web in the z direction of FIG. 1 to give the same net effect as width $w_2$. Rotation is prevented about the x' axis in a manner similar to rotation described previously about the y' axis. Thus, any disturbing torque tending to rotate member 12 about x' of FIG. 1d tends to elongate the webs in tension such that the greatest elongation occurs adjacent the edges of the webs, such as edge 9' of web 14 when a clockwise rotation is imparted to member 12. In this case, the components of the stress tending to provide a restoring torque to member 12 lie in the y' –z' plane.

At the same time, point 27 on web 14 disposed adjacent edge 9 and anchorage position 20 at member 12 tends to translate in a direction opposite to that of point 26. This latter motion tends to collapse web 14 at edge 26, producing a warped condition in web 14. The pliable characteristic of the web permits member 12 to rotate about x' subject only to the tensile restoring forces in the web. In this case, since only a portion of the web provides a restoring tensile stress, the width $w_2$ needs to be greater than the width $w_1$, for a given disturbing load. If web 14 were not pliable, but rigid, then rotation about the x' axis would be prevented, not only by the elastic tensile properties of web 14 but by compressive properties between points 25 and 27 and would create a complex system similar to a truss arrangement. From the foregoing it is clear that a width $w_2$ may be readily determined.

To prevent translation of member 12 along an axis parallel to the z axis, a predetermined width $w_3$ is given webs 14–17, inclusive, in the direction of the z coordinate. In this case, the restoring stress components, in the x–y plane are solely the function of shear, since the plane of the webs are parallel to the z coordinate. However, shear stresses in pliable material of the type described tend to be directed as tensile forces along the diagonal of the webbing from corner to diagonally opposite corner such as between points 25 and 26 of web 14 as illustrates by arrow $F_s$ of FIGS. 1a, 1b, and 1c.

Force $F_s$ is established when a disturbing force $F''$ of FIG. 1d is applied to member 12 along the z coordinate. Stress $F_s$ diagrammatically represents the tensile components of the restoring stresses in web 14 which are resolved into compressive forces normal to the line of $F_s$ and tensile forces parallel to the line of $F_s$. The webbing material does not support compression in a direction parallel to the plane of the web since the material is pliable as indicated above, therefore, the web supports solely the tensile stress which is directed along $F_s$.

It can be shown that in a web suspension system in accordance with the present invention, a restoring force in the $z$ direction may be represented by the following relationship:

$$F_z = 0.02 \, w \times T \times S \times \cos\theta \qquad (3)$$

where:

$F_z$ is the restoring force component in $z$ direction;

$w$ is the web width in $z$ direction;

$T$ is the web thickness;

$S$ is the stress due to disturbing load on member 12; and $\theta$ is the angle of the resolved tensile force $F_s$ in the plane of the web to the $z$ coordinate (see FIG. 1a).

Thus, from the foregoing equation (3), the greater the width $w_3$ and the smaller the angle $\theta$, the greater will be the restoring force for a given material in the $z$ direction. For a given angle $\alpha_1$ between web 14 and the $x-z$ coordinates, the angle $\theta$ proportionately decreases as width $w_3$ increases. This latter condition is the determining factor for providing increased stiffness to the suspension of member 12 as expressed by equation (3). Therefore it is clear that predetermined width $w_3$ is calculable.

The width $w$ in the $z$ direction contributes to the stiffness of the suspension of member 12 in several separate directions as described. First, in translation in the $z$ direction, second, in rotation about an axis parallel to the $y$ direction, and, third, in rotation about an axis parallel to the $x$ direction.

The final width $w$ selected in view of these factors is the smallest width of widths $w_1$, $w_2$ and $w_3$ necessary to provide the desired stiffness in any of the above mentioned directions in accordance with a given set of environmental conditions.

In view of the above description, it is clear that the above analysis with respect to web 14 equally applies to the remaining webs to provide restoring force symmetry to the suspension system.

All of the webs are preferably prestressed and fully extended (no slack). The amount of prestressing to be applied to the webs is determined from the expected disturbing forces or torque on member 12 such that a displacement thereof will not cause a slack in any of the webs. Since the webs are pliable and collapsable, any tendency to move the ends of a web together will tend to collapse that web. However, this slack, if permitted to occur, may cause undesirable motions in a vibrating environment. Therefore, the webs are elongated under prestress such that any possible displacement due to a disturbing force or torque will be less than the prestress elongation, maintaining the extended condition (warped or planar-no slack) of each of the webs. For example, if by prestressing the webs 14–17 inclusive, an elongation $\delta m$ is provided in each web, then when member 12 is displaced in any direction such that some of the webs will collapse a distance equal to or less than $\delta m$, then all of the webs will remain fully extended. Further, prestressing the webs provides additional stiffness to the system as described above by providing force components on the webs which tend to oppose a disturbing motion of member 12 in any direction. These prestress force components cooperate with restoring tensile force components induced by a disturbing load to maintain system equilibrium.

Further advantages of the foregoing system may be provided by the application of webbing materials exhibiting good thermal insulating qualities. Since webbing materials may be constructed relatively thin, i.e. 5 mils or less, while providing high tensile stress properties, the total cross section area of the webbing may be substantially reduced as compared to other forms of suspension such as solid or tubular spacers and isolators or coil springs. This reduction in cross section area coupled with corresponding high tensile strength imparts relative increased stiffness to the suspension system while reducing the thermally conductive paths to the suspended member. Employing low thermal conductivity materials provides further reduced thermally conductive paths and is an improved way of suspending a member in a relatively stiff spring suspension system not available in other suspension systems. This combination of functions, thermal and spring, of the system of the present invention is further enhanced over systems of the prior art when it is desired to suspend components at cryogenic temperatures. At these lower temperatures, prior art thermal isolators tend to be good thermal conductors, the thermal conductivity being caused by the increased masses required to provide acceptable stiffness to the suspension system.

In the foregoing description, forces were assumed to be directed at suspended member 12 and along the given coordinates. It will be appreciated that more complex forces and torques at any angle and directed at any component or portion of the system will equally conform to the above description, but which includes more complex analysis.

Figure 2A:
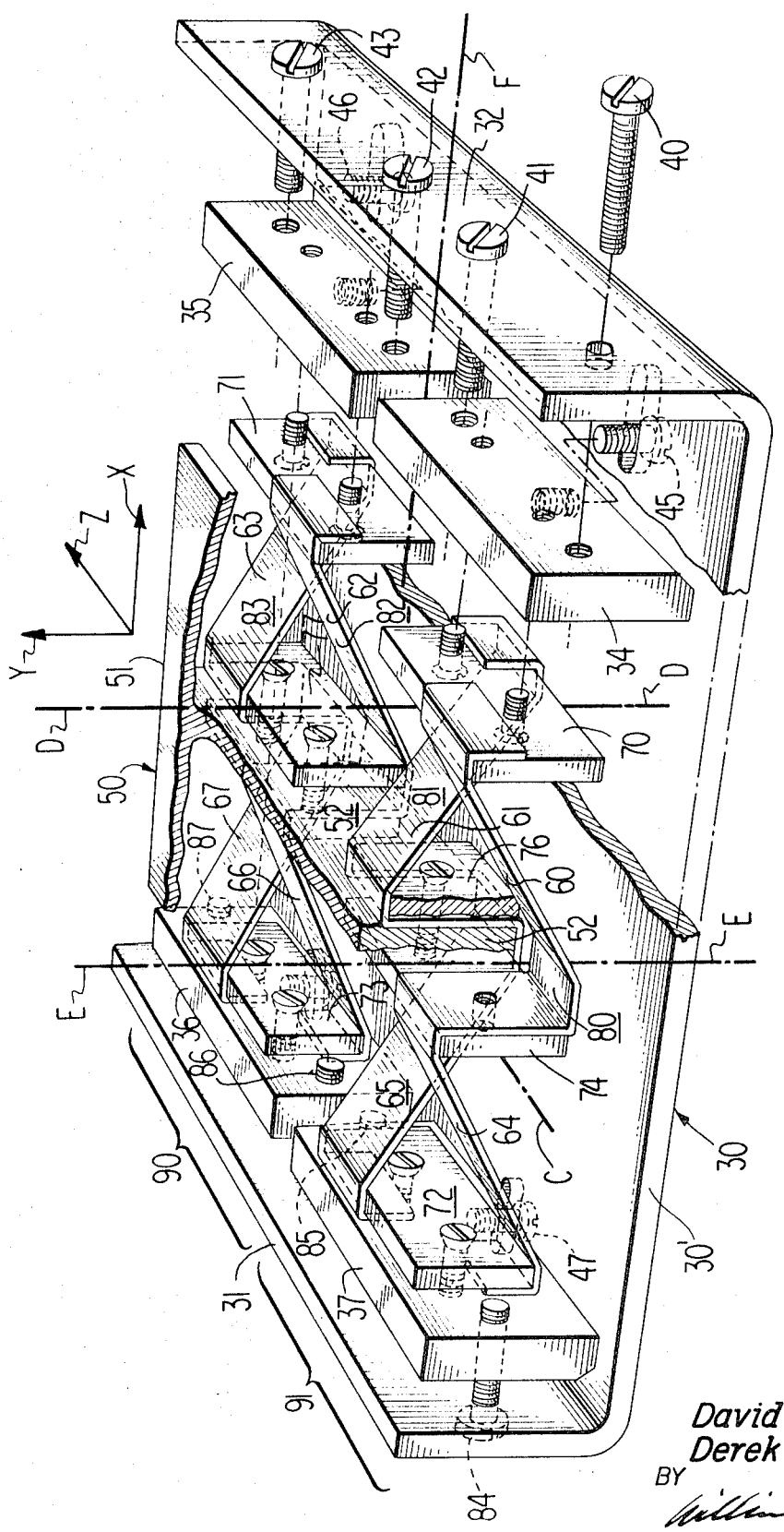

FIGS. 2a, 2b, and 2c clearly illustrate an embodiment of the foregoing principles for suspending a body in stiff equilibrium. Advantageously, the structure of this embodiment is one which is suitable for optical systems using detectors operating at cryogenic temperatures since the structure is substantially insensitive to temperature changes. Member 50 is suspended from supporting structure 30 by means of webs 60–67, inclusive, member 50 being suspended between legs 31 and 32 of U-shaped structure 30. Member 50 is an integral T-shaped body having a cross plate portion 51 for supporting thereon a selected instrument such as an optical device, and a leg portion 52 secured thereto at right angles. The webs 60–68 inclusive are respectively secured to leg 52 and to adjustable tension plates 34–37.

To suspend member 50, webs 60–67 are arranged as follows. Webs 60, 61, 64 and 65 form a first set 91 and webs 62, 63, 66 and 67 form a second set 90 spaced from the first set in the $z$ direction. Each web of web pairs 60 and 64, 61 and 65, 62 and 66, and 63 and 67 is oriented such that the other web of that pair lies substantially in the same $x-y$ plane (see FIG. 2c), each of the above mentioned pairs being spaced with respect to each other in the $z$ direction. The webs of each pair, in this case, are preferably parallel to each other. Each of the pairs of each set are preferably spaced in close proximity to the other pairs of that set while the sets are more remotely spaced from each other in the $z$ direction as shown in FIG. 2c to balance the system in a manner to be described.

Each set of webs includes first and second webs, for example, webs 60 and 61 in set 91, and webs 62, and 63 in set 90, and third and fourth webs, for example, webs 64 and 65 in set 91 and webs 66 and 67 in set 90. Each of the webs are arranged so that the plane of that web is disposed at some angle $\beta_1$ (FIG. 2b), to the $x$ coordinate and at some angle $\beta_2$ to the $y$ coordinate.

One web of the first and second webs of each set and one web of the third and fourth webs of each set, for example, webs 61, 63, 64 and 66, are secured at one end thereof to leg 52 at an anchorage position at the upper edge of leg 52 adjacent cross plate 51, while the other webs, for example, webs 60, 62, 65, and 67 are secured at one end thereof to the lower edge of leg 52 at an anchorage position remote to and spaced from cross plate 51 in the $y$ direction. The other ends of the webs are secured to tension plates 34–37 inclusive, and are oppositely spaced thereat in the $y$ direction with respect to the one end. That is, one of webs 60 and 61 is secured to plate 34 at anchorage positions adjacent to plate 51 in the $y$ direction, for example, web 60 of FIG. 2b, and the other web is secured to plate 34 at an anchorage position remote from cross plate 51 in the $y$ direction for example, web 61 of FIG. 2b. Thus, as shown in FIG. 2b, the planes of the first and second web of each set, 60, 62 of set 91 and 61, 63 of set 90 intersect at line B which defines a line parallel to the anchorage position of these webs. Similarly, the planes of the third and fourth webs of each set, 64, 66 of set 91 and 65, 67 of set 90 intersect at line A which defines a line parallel to the anchorage position of these webs, all anchorage positions being parallel to each other.

Preferably, angles $\beta_1$ and $\beta_2$ which are here representative of the angles of all the webs to the $x$ and $y$ coordinates, respectively, are 45°, although angles different than this may be employed in any combination of webs. Further, all the angles are preferably the same, but need not be the same in all cases. For example, it is clear the angles are a function of the stiffness desired in a particular direction, and as described above for the embodiment of FIG. 1, the force components will vary proportionately.

To secure the respective webs to tension plates 34–37 and leg 52, the webs are clamped with clamping plates 70–73 as shown in FIGS. 2a, 2b and 2c. To facilitate construction, web pairs 60 and 64, 61 and 65, 62 and 66, and 63 and 67 are each formed from a single strip of webbing 80–83, respectively. Each of the strips are wrapped under leg 52 and between one of plates 74–77 and leg 52. The ends of the respective strips are then disposed between the respective clamping plates 70–73 and corresponding tension plates 34–37. Adjustment of the tension in the webs is made by way of screws 40–43 or screws 84–87, and once adjusted, tension plates 34–37 are secured to structure 30 by screws 45–48, as shown. Adjustment of the tension of the webs in this manner permits presetting the system stiffness to any desired setting.

The significance of the arrangement of the webs of FIGS. 2a–2c inclusive, is that for every disturbing torque in any direction, an equal and opposite restoring torque is set up in at least one of the webs and for every disturbing force in any direction, an equal and opposite restoring force is set up in at least one of the webs, preferably none of the webs going slack when member 50 is displaced from its equilibrium position.

The manner in which the structure of the invention provides restoring force symmetry is suspended member 50 will now be described. First, as shown in FIG. 2b, it is clear that each of the webs 60–67, when stressed, produces a restoring force having components in both the $x$- and $y$-direction. Further, each web, having its plane parallel to the $z$ coordinate, has a width in the $z$ direction sufficiently great to prevent translation of suspended member 50 in the $z$ direction. However, unlike the structure of FIG. 1, the width of the web need not be such as to prevent rotation about an axis parallel to the $x$ and $y$ coordinates since these rotations are precluded by the arrangement of the webs in the $z$ direction as will be described. Therefore, the width in the $z$ direction need only be sufficiently great so that the diagonal restoring shear stress components $F_s'$ (FIG. 2c) has $z$ components $F_z$ which will provide a sufficient restoring stress for maintaining the equilibrium position of member 50 when a disturbing translational force $F_T$ in the $z$ direction is applied to member 50. These shear stresses are similarly developed as described previously for the embodiment of FIG. 1.

To prevent rotation of member 50 about an axis parallel to the $z$ axis, the webs are arranged to provide balancing torque couples. Axis C is arbitrarily chosen as such an axis. Axis C is similarly disposed as axis $Z'$ of FIGS. 1a–1d, inclusive, (See FIG. 2b). Webs 60 and 64 provide a counter clockwise torque couple to member 50 about axis C while webs 61 and 65 apply a torque couple to member 50 about the same axis in the opposite direction. Therefore, member 50 cannot rotate about axis C without setting up a restoring torque in at least two of these webs. Similarly, webs 62 and 66 cooperate to apply a counter clockwise torque couple about axis C while webs 63 and 67 cooperate to apply a torque couple in the opposite direction about the same axis. The net effect of these torque couples is to maintain member 50 in rotational equilibrium about axis C. Thus, if axis C were placed anywhere in the $y$–$z$ plane parallel to $z$, rotation of member 50 sets up in at least one web a restoring stress tending to maintain the equilibrium position.

With respect to rotation of member 50 about an axis parallel to the $y$ coordinate, if an E axis is provided parallel to the $y$ coordinate and disposed between webs 60, 61, 64 and 65 through member 50, as illustrated in FIG. 2c, it is clear that webs 60 and 65 cooperate to apply a torque to member 50 about the E axis in the counter clockwise direction while webs 61 and 64 cooperate to apply a torque to member 50 in the opposite direction. Of course, it is the force components of the restoring stresses in the webs in the $z$–$x$ plane which provide these torques.

Similarly, if a D axis is provided parallel to the $y$ coordinate disposed between webs 62, 63, 66 and 67 of set 90 as shown in FIG. 2c, equal and opposite torques are applied to member 50 in the same manner as about the E axis. These torques are equivalent to the torques in the webs of FIGS. 1a–1d, about the $y'$ axis, where it was pointed out that the greater web width provided the greater restoring stress. By spacing a plurality of narrower webs in the z direction, the same net effect results. That is, with respect to rotation about the D or E axes, the width w of the webs may be increased resulting in an arrangement shown by FIG. 1a–1d.

If either the E or D axis is displaced anywhere along the z coordinate from the position shown, then the various webs of the two sets cooperate to apply equal and opposite torques to member 50 about any axis parallel to the y coordinate. For example, webs 63 and 64 have stress components in the x–z plane which tends to apply a clockwise torque to member 50, while webs 60 and 67 tend to apply a counter clockwise torque. Similarly, webs 61 and 66 provide a clockwise torque while webs 62 and 65 apply an equal and opposite torque. These restoring torques, although provided by a plurality of webs rather than a single web in the z direction are equivalent to the description of the torques about the $y'$ axis of FIG. 1a–1d.

With respect to rotation about an axis parallel to the x coordinate, axis F is such an axis which is arbitrarily disposed between sets 90 and 91. Axis F is equivalent to $x'$ axis of FIG. 1. A pair of webs in each of sets 90 and 91 cooperate to apply a torque to member 50 about the F axis in one direction while a pair of webs in each set cooperate to apply a torque about the F axis in the opposite direction. For example, webs 60 and 65 of set 91 cooperate with webs 63 and 66 of set 90 to apply a torque to member 50 about the F axis in one direction while webs 61 and 64 of set 91 and webs 62 and 67 of set 90 cooperate to apply a torque in the opposite direction. Further, any disturbing torque tending to rotate member 50 about any axis parallel to the x axis sets up restoring stresses in at least two webs of one of the sets which tends to maintain the equilibrium position. By spacing sets 90 and 91 a distance from each other in the z direction, the greater this distance, the greater the disturbing torque that the system will withstand for a given material about an axis parallel to the x axis.

With respect to translational forces tending to displace member 50 from its equilibrium position, it will now be shown that equal and opposite restoring stresses are set up in certain ones of the webs by a disturbing force in any direction tending to translate member 50 in that direction.

In FIG. 2b, any tendency of member 50 to be displaced in the y direction is resisted by restoring stresses in webs 64, 66 and 61, 63 by restoring stresses in web 65, 67 and 61,63 when the disturbing force is in the opposite direction. Any tendency of member 50 to be displaced from the equilibrium position in the x direction is resisted by restoring stresses in webs 64–67, inclusive, while a displacement in the opposite direction provides restoring stresses in webs 60–63, inclusive. These latter restoring stresses are provided in the direction of both the x and y coordinates as a result of the angular relationship of the webs of these coordinates. It is clear that any tendency to displace in translation member 50 at any angle in the x–6 plane will tend to elongate at least one web in each of sets 90 and 91, providing appropriate restoring stresses in the elongated webs.

With respect to the z direction, any tendency to displace member 50 in this direction provides restoring stresses across the diagonal of each web which is a function of the modulus of elasticity and width in the z direction of the webbing, as described previously for the embodiment of FIG. 1a–1d, and in particular, as set forth in equation 3. As shown in FIG. 2c, when a translational force $F_T$ tending to displace member 50 in the z coordinate is applied thereto, equal and opposite force components are set up in each of the webs, which tend to maintain member 50 in its equilibrium position, for example, component $F_z$ of force $F_s{'}$ in web 61.

It will be appreciated that to provide equilibrium to a member having six degrees of freedom as in the suspension system of the present invention, the restoring forces provided in the various webs are the result of a complex relationship when complex disturbing forces and torques are applied to the suspended member. This complexity increases in the structure of FIGS. 2a, 2b, and 2c due to the plurality of the web and their particular arrangement. However, it is clear that the spaced relationship of the webs, their angles to the x–y coordinates, the particular arrangement of the webs in each set, and the prestress all contribute to maintaining member 50 in an equilibrium position in a system having force restoring symmetry.

Thus, while member 50 is in spring-like suspension, and therefore behaves as a rigid body with support structure 30 below a predetermined natural system frequency it remains suspended in an elastic suspension system. Very high natural frequencies for the system may be provided by selecting the webbing material accordingly. Further advantages of the system of the present invention may be provided by making the webbing from low thermal conductivity material which is capable of high tensile prestressing. One such material is a polimide film made in accordance with the teachings of U.S. Pat. No. 3,179,364 and manufactured under the trademark "Kapton" by the E. I. DuPont De Nemmers & Co. Inc., Wilmington, Del. This film has a tensile strength (ultimate) of 17,000 psi at 200°C to 35,000 psi at −195°C, a yield point of 10,000 psi at 3 percent elongation at 250°C and a tensile modulus of 260,000 psi at 200°C to 510,000 psi at −195°C, and a coefficient of thermal conductivity of $$3.73 \times 10^{-4} \text{ (cal) (cm)/(cm}^2\text{) (sec) (°C)}.$$

In a structure built in accordance with the present invention as shown by FIGS. 2a–2c, inclusive, the webs 60–67, inclusive, were prestressed to 3000 psi, were made of 5 mil thick "Kapton" and were strung at an angle $\beta_1$ and $\beta_2$ of 45°, had a width of 0.250 inches and were approximately 0.8 inches long in the suspended state. Member 50 had a length of 5.5 inches in the z direction and a leg 0.6 inches wide in the y direction. Web strip 80 was spaced in the z direction one-half inch from web strip 81 center line to center line. Web strip 82 was similarly spaced one-half inch from web strip 83. Sets 90 and 91 were spaced from each other in the z direction approximately 3.7 inches from center line of strip 81 to center line of strip 82. The structure, in this case, was geometrically symmetrical. This structure withstood disturbing forces of up to 8 LB and returned to its original position (hysteresis) within 0.33 milliradians in the z direction. The 8 LB force was produced by placing an 0.089 weight centrally on member 50, subjecting the system to about 10, vibrations (10 times gravity), and produced a system Q (gain) of about 9 having a natural frequency of about 400 hz.

Figure 3:
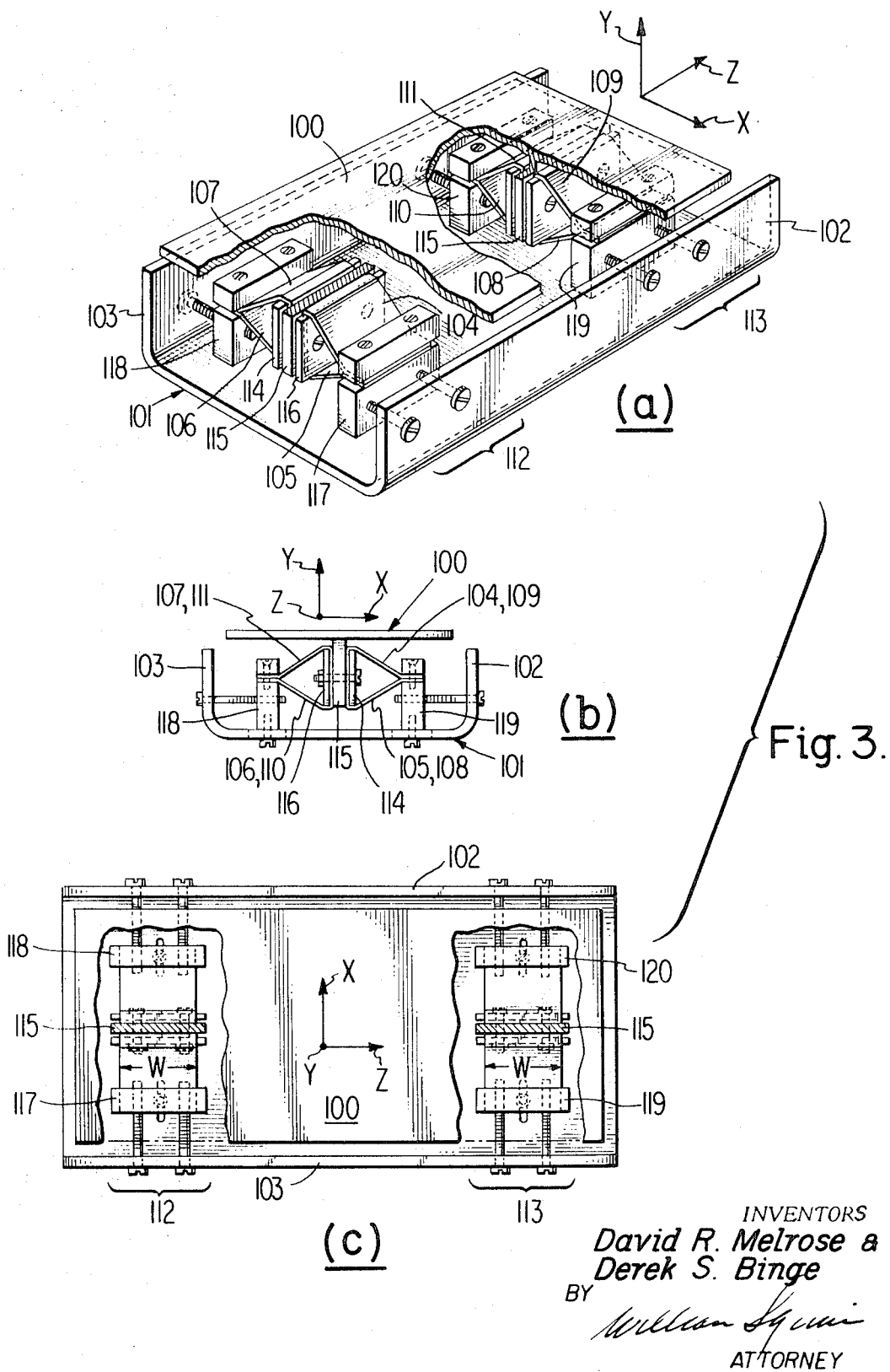
Figure 6:
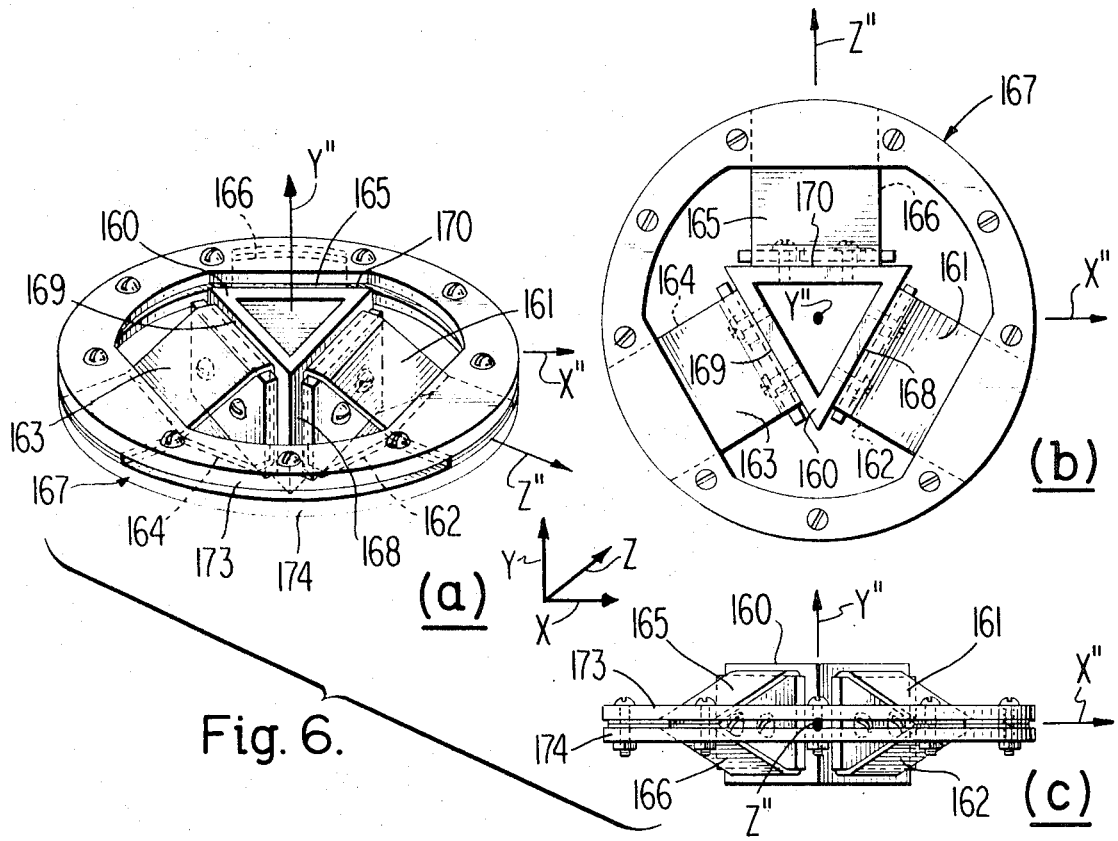
Figure 7:
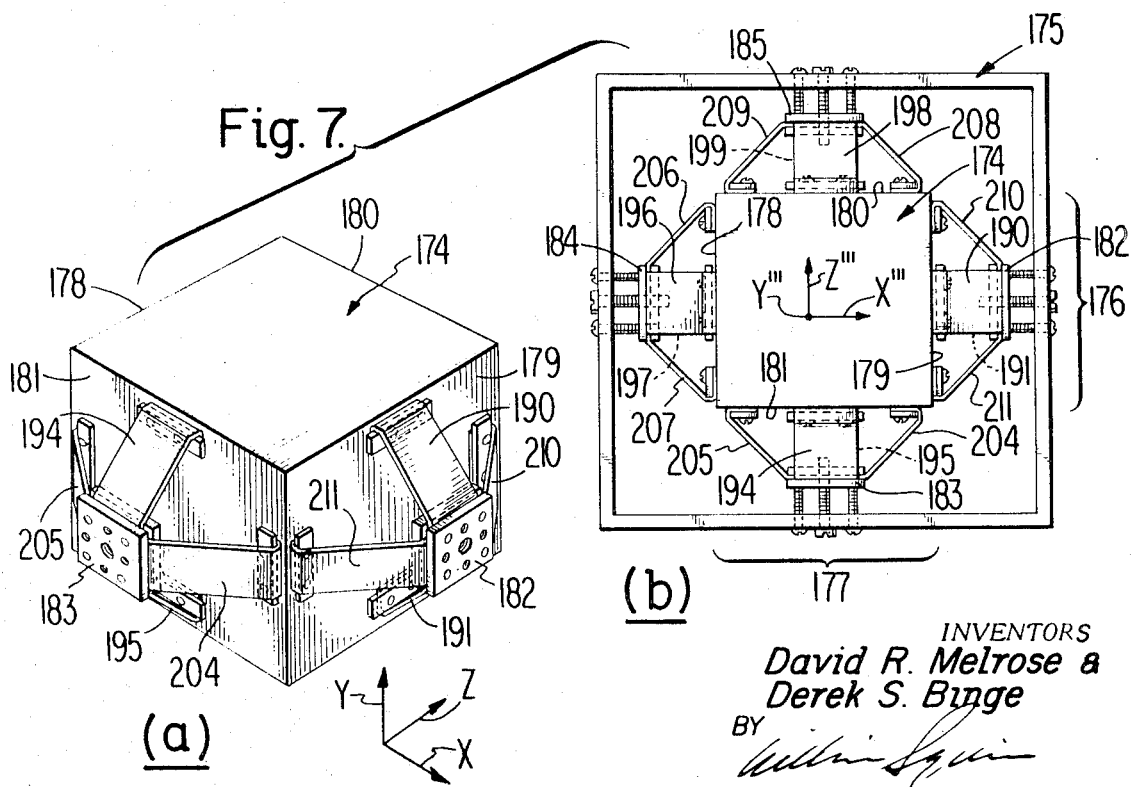

Further embodiments of the present invention are illustrated in FIGS. 3–11 which conform to the principles outlined above in conjunction with FIG. 1. In FIG. 3, a suspended T-shaped member 100, similar to that of member 50 of FIGS. 2a–2c, inclusive, is suspended from a U-shaped support structure 101. Member 100 is suspended between legs 102 and 103 by webs 104–111, inclusive. Webs 104–107 form a first set 112 and webs 108–111 form a second set 113 disposed in the z direction with respect to each other similar to sets 90 and 91 or FIGS. 2a–2c, inclusive, while the suspension of member 100 by each of the sets 112–113 is similar to that described for the structure of FIGS. 1a–1d, inclusive.

Webs 108–111 are formed between leg 115 and tension plates 119,120, respectively, forming set 113. One web of web pairs 104 and 109, 105 and 108, 107 and 111 and 106 and 110 is parallel and in the same plane as the other web of that pair forming a diamond configuration as shown by FIG. 2b. The width w of each web extends in the z direction. The arrangement of the webs is clearly illustrated in FIGS. 3a, 3b and 3c.

The configuration of FIGS. 3a, 3b and 3c differs from that of FIG. 1a–1d, inclusive, in that the former includes a pair of sets 112 and 113, each of the sets being similar to the configuration of FIG. 1a–1d, inclusive. It is readily apparent that the width w of the webs of FIGS. 3a, 3b and 3c need not be as great for a given disturbing load on member 100 as would be on member 12 of FIGS. 1a, 1b, 1c and 1d for a given disturbing force. The spacing of the sets in the z direction provide the same net effect as does the width of the webs in this direction for stabilizing member 100 about an axis parallel to the y coordinate and about an axis parallel to the x coordinates as described for the embodiment of FIGS. 2a–2c inclusive. Restoring stresses in the webs which are a function of the angle of the plane of each of the webs to the x–y coordinates and the width in the z direction are provided which tend to maintain the equilibrium position of member 100 in rotation about the z coordinate and translation in all the coordinates in the same manner as described for the embodiment of FIGS. 2a–2c.

As clearly shown in FIGS. 4a, 4b and 4c, cubic member 121 is suspended within annular split ring support structure 130 by a plurality of webs 122–129, inclusive. The webs of FIGS. 4a, 4b and 4c are arranged in a plurality of pairs 122 and 123, 124 and 125, 126 and 127, and 128 and 129, wherein the webs of each pair are anchored at a common anchorage position on the support structure, and at spaced anchorage positions on the suspended member in converging relationship. Two pairs of webs, e.g. 122–123, and 126–127 or 124–125 and 128–129 together form a set of webs such that two sets 131 and 132 of webs are provided with four webs per set as seen in FIG. 4b. However, the pairs in each set, instead of being coupled to a planar suspended member such as member 12 of FIG. 1, leg 52 of FIG. 2, or leg 115 of FIG. 3, are spaced from each other a distance d (FIG. 4c) which is approximately the width of the webs.

In contradistinction to the arrangement of FIGS. 3a–3c, inclusive, wherein the webs of the two sets are displaced in the z direction, the webs of the two sets in the configuration of FIGS. 4a, 4b and 4c are rotated with respect to each other 90° about the y axis forming two diamond shaped structures disposed at right angles to each other and having a common cubic diagonal member 121.

As illustrated, the web pairs may each be respectively constructed of a single strip of webbing disposed between respective clamps 133–136 and member 121, the ends of the webs being clamped by support structure 130. To provide prestressing, the ends of the webs, for example ends 137 and 138 of webs 133 and 125, respectively, may be pulled between two mating halves 139–140 of the support structure as shown in FIG. 4a prior to clamping halves 139 and 140 together. Clamps 133–136 are each firmly secured to member 121 to prevent slippage of the webs therebetween when the webs are stressed.

In comparison with the previously described configurations, added stiffness is provided in translation in the direction of any of the coordinates due to the angular relationship to that coordinate of all the webs of at least one set of webs. Thus, with respect to translations in, for example, the z direction, the widths of webs 124, 125, 128 and 129 cooperate in shear to provide restoring stresses while webs 122, 123, 126 and 127 cooperate in tension to provide additional restoring stresses. These stress relationships are repeated when translation of member 121 in the x direction is attempted such that the webs that were in shear are in tension and the webs that were in tension are in shear. The same analysis is present for translation in the y direction as was described for the structures of FIGS. 1a–1d, 2a–2c, and 3.

Disturbing torques tending to rotate member 121 about axes parallel to either the x or z coordinates tend to produce restoring tensile stresses in one set of webs such that member 121 is maintained in equilibrium similarly as member 12 about the z' axis of FIG. 1. In addition, member 121 is further maintained in suspended equilibrium about axes parallel to either the x or z coordinates by restoring stresses in the other set of webs due to the perpendicular relationship of the two sets 131 and 132. Rotation about an axis parallel to the y coordinate of FIGS. 4a, 4b and 4c would result in substantially the same analysis as for rotation about the y' axis of FIG. 1a–1d, inclusive, which would be a function of the width d of the respective webs. In this instance, two sets of webs contribute to the stiffness of the system as compared to the sole set of FIG. 1.

In FIGS. 5a, 5b and 5c the arrangement illustrated is a combination of the arrangements shown in FIGS. 4a, 4b, and 4c and 2a, 2b and 2c. Cubic member 141 is suspended within annular ring or box support structure 142 by a plurality of webs 143–150. The webs are arranged in two sets 151 and 152, the webs in each set being similarly related within the set as are the webs in each of sets 90 and 91 of FIGS. 2a, 2b and 2c. The adjacent webs of web pairs 143, 144; 147, 148; 145,146; and 149, 150, within each set are anchored at spaced positions on a different side of member 141 and on a corresponding different side of structure 142 to form an X in end view as shown in FIG. 5c.

Again, as were the web sets of FIGS. 4a, 4b and 4c, the sets 151 and 152 of FIG. 5b are rotated 90° with respect to each other about an axis in the center of the suspended member parallel to the $y$ coordinate instead of being spaced in the $z$ direction in parallel arrangement as shown by FIG. 2c. This is clearly illustrated in FIG. 5b.

Translation is prevented in any of the coordinates by restoring tensile stresses set up in at least two of the webs. Member 141 is prevented from translating in the $x$ and $z$ directions by restoring force components arising from the angular relationship of the webs to the (i) $x$ and $y$ and (ii) $z$ and $y$ coordinates, respectively. In this latter instance, the width of the webs, for example, webs 147-150, cooperate in shear with the tensile restoring stress components in webs 143-146 when member 141 is translated in the $z$ direction.

Figure 2:
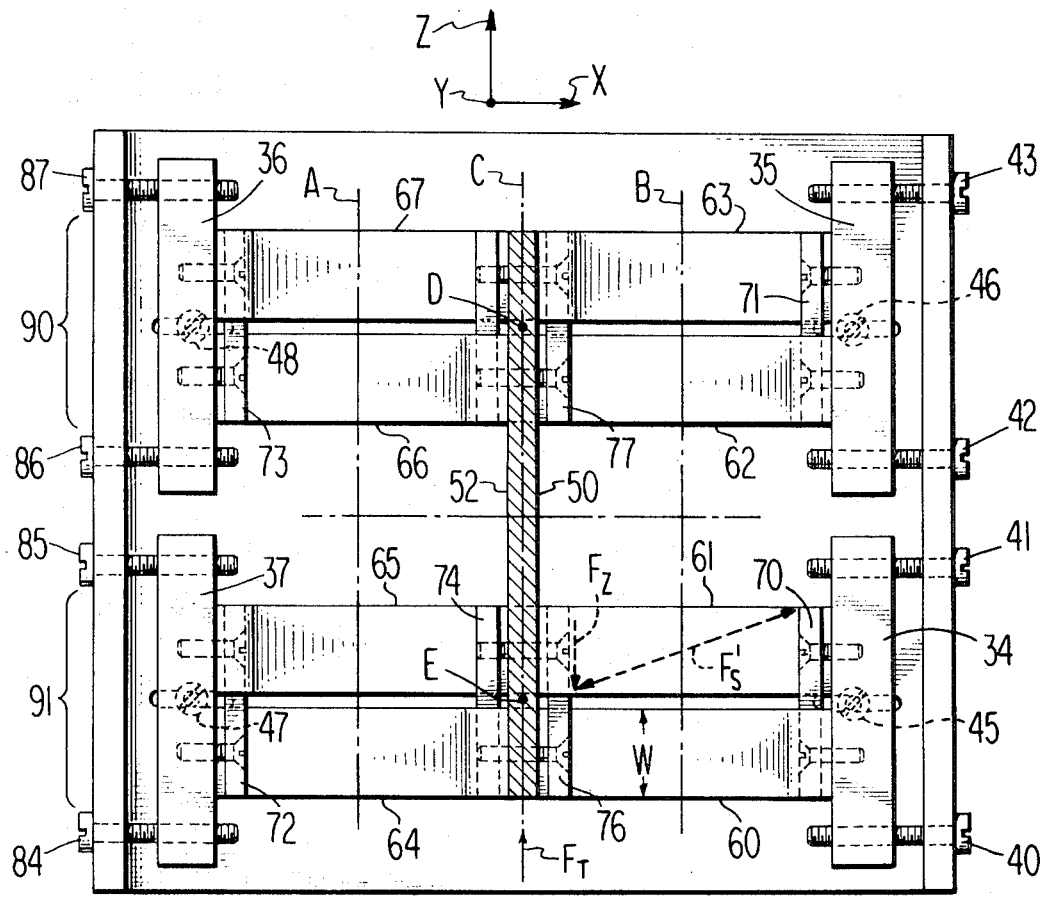
Figure 2:
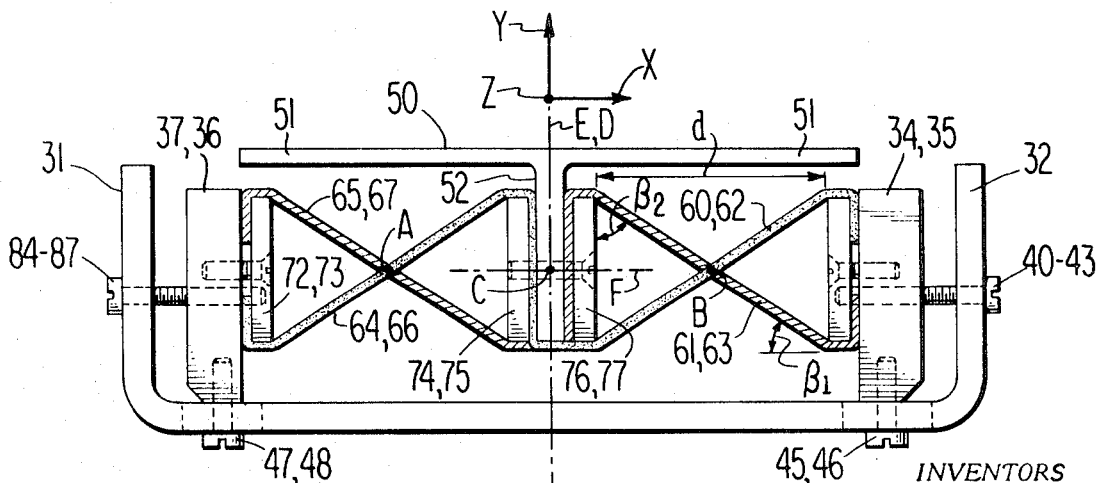

Rotation about axes parallel to the $x$ and $z$ coordinates of member 141 of FIG. 5 is subject to similar restraints as rotation about the $z'$ axis of FIG. 1 or the C axis of FIG. 2. Rotation about an axis parallel to the $y$ coordinate is a function of shear in the webs and therefore is dependent upon the width of the webs in both the $x$ and $z$ directions.

In FIGS. 6a, 6b and 6c triangular prism member 160 is suspended from annular split support structure 167 by a plurality of webs 161-169. Unlike the previously described embodiments, the web pairs in the structure of FIGS. 6a, 6b and 6c are suspended in 120° alignment with respect to each other in plan view (FIG. 6b) instead of 90° or 180° alignment. Clamped to sides 168-170, inclusive, of member 160 are web pairs 161 and 162, 163 and 164, and 165 and 166, respectively. The webs of each of the web pairs is oriented with respect to each other similarly as are the webs of web pairs 14 and 15 or 16 and 17 of FIGS. 1a-1d, inclusive. The web pairs are each formed of a single strip of webbing which is passed between a respective clamping plate and suspended member 160 as illustrated. The webs may be prestressed by pulling the ends thereof, for example, ends 171 and 172 of webs 163 and 164 respectively, between the clamping halves 173 and 174 of split support structure 167 to the desired tension.

It is clear than any disturbing torque tending to rotate member 160 about any axis in any direction produces a corresponding restoring stress in at least one of the webs. Two pairs of webs are disposed such that the plane of each of the webs thereof are disposed at some angle other than 90° to all three coordinates. Due to this angular relationship to all the coordinates of the three coordinates system, three pairs of webs may be utilized to provide rigid suspension where four pairs were previously described. Further, any disturbing force tending to translate member 160 in any direction provides a restoring stress in at least two of the webs.

The structure of FIGS. 7a and 7b utilizes two sets of webs 176 and 177, respectively, each set including eight webs for suspending cubic member 174 within annular ring support structure 175. Each of sets 176 and 177 includes all the webs disposed on opposite sides of member 174 along the $x$ coordinate and $z$ coordinate, respectively.

Disposed on each respective side of member 174 are two pairs of webs. Web pairs 196, 197 and 206, 207 are on side 178, pairs 190, 191 and 210, 211 are on side 179, pairs 198, 199 and 208, 209 are on side 180 and pairs 204, 205 and 194, 195 are on side 181. The webs of each pair are anchored to member 174 at spaced anchorage positions in the $y$ direction and converge to anchorage positions spaced in the $y$ direction on tension plates 182-185, which in turn, are moveably secured to support 175 in the $x$ or $z$ direction, as the case may be, as clearly shown by FIG. 7b. The spaced anchorage positions are such that each pair of converging webs, forms, with the respective side of member 174 and with the respective tension plate 182-185, a truncated triangle such as shown in FIG. 7b by webs 210, 211, side 179, and tension plate 182. The two truncated triangles on each side of member 174 are disposed at right angles to each other with the triangle base and truncated top formed of common members, while each pair of webs has an oppositely disposed corresponding pair on opposite sides of member 174. The corresponding oppositely disposed pairs are related to each other similarly as are web pairs 14, 15 and 16, 17 of FIGS. 1a, 1b, 1c and 1d.

Clamping plates secure the respective webs to member 174 and to the respective tension plates as illustrated, the tension plates being adjusted to set the desired pretension in the webs.

Each pair of webs of each set is disposed at an acute angle to each of the two of the coordinates as were the webs of FIG. 1a-1d, while the plane of the webs is parallel to the third coordinate. For example, webs 190 and 191 are disposed at an angle to the $y$ and $x$ coordinates, while webs 192 and 193 are disposed at an angle to the $x$ and $z$ coordinates, the plane of webs 192 and 193 being parallel to the $y$ coordinate and the plane of webs 190 and 191 being parallel to the $z$ coordinate.

Upon comparison of the structure of FIGS. 7a, 7b and 7c with the structure of FIGS. 4a, 4b and 4c, it is seen that one pair of webs on each side 178-181, respectively, of member 174 of FIG. 7b such as web pairs 190-191, 194-195, 196-197, and 198-199 are the equivalent of the structure of FIGS. 4a-4c inclusive.

In the structure of FIG. 4, as described, restoring shear stresses are produced in the webs when the suspended member is rotated about the $y$ axis, which shear stress is a function of the web widths. However, in the structure of FIGS. 7a, 7b and 7c these shearing restoring stresses are produced in webs 190-199, and in addition, tensile restoring stresses are produced in the remaining webs 204-211. Thus, in the structure of FIGS. 7a, 7b and 7c, tensile restoring stresses which are a function of the angle of the web to the coordinates and shear restoring stresses which are functions of the width in the coordinate in which motion is to be resisted are both provided. Thus regardless of the direction of a distrubing torque or force additional restoring forces or torques are provided.

Figure 8:
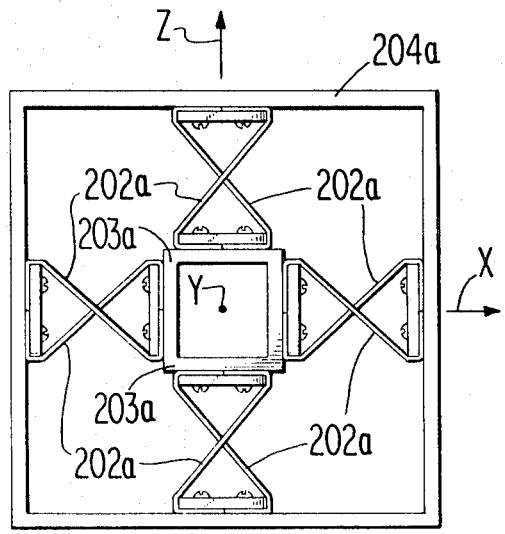
Figure 9:
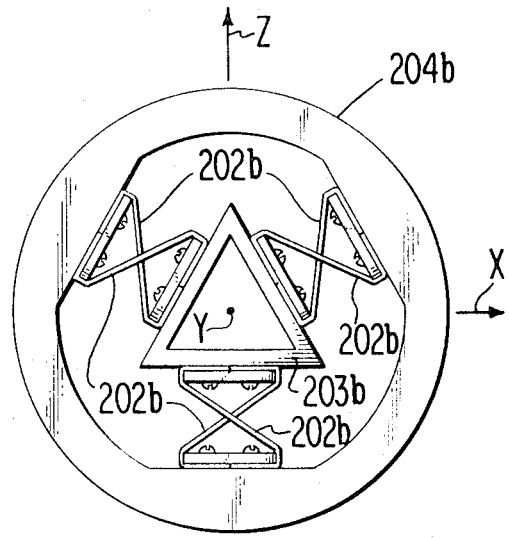
Figure 10:
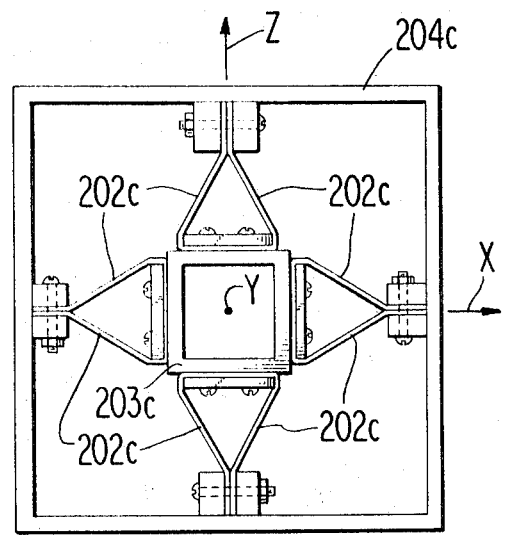
Figure 11:
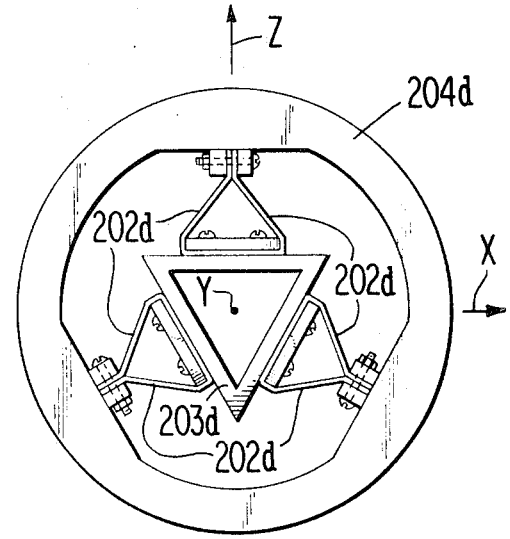

In FIGS. 8-11, inclusive, suspended members 203a-d are suspended from annular support structures 204a-d, respectively, by webs 202a-d, respectively. FIG. 8 is a variation of the arrangement of FIGS. 5a, 5b and 5c in which the anchorage positions and the plane of each of the webs are rotated 90°, the plane of the webs of FIG. 8 extending parallel to the $y$ axis while the anchorage positions are spaced in the $x$ and $z$ directions instead of the $y$ direction. The embodiment of FIG. 9 is similar to the triangular prism suspended member of FIG. 6 in which the anchorage positions and the plane of the webs are rotated 90°. The embodiment of FIG. 10 is similar to the arrangement of the structure of FIG. 4 with the webs and anchorage positions therefore rotated 90°, while the webs and anchorage portions thereof of the structure of FIG. 11 are rotated 90° from the orientation of the webs of FIG. 6. It will be appreciated thus that for each of these arrangements, a disturbing torque tending to rotate the suspended member will produce a restoring stress in at least one of the webs and a disturbing force tending to translate the suspended member produces a restoring stress in at least one of the webs when applied to the suspended member in any direction.

It will be seen that the objects of the invention have been accomplished. A suspension system has been provided which provides a substantially effective force restoring symmetry with respect to the suspended member. In general, such a system is provided with geometric symmetry as has been described. However, it should be further appreciated in certain situations assymmetrical geometric arrangement of the component webs may be utilized and nevertheless, symmetrical force restoring symmetry is provided by selecting the webs having different properties, particularly, web width, web modulus of elasticity, web angular relation or orientation to the other webs of the system, and the degree of web prestress as related to the degree of prestress in the other respective webs. Thus, it will be appreciated that the invention lends itself to a great variety of needs of environmental specifications with respect to maintaining a member in a dynamic state of equilibrium.

What is claimed is:

1. An apparatus for suspending a rigid member from a support, comprising:

a plurality of strips of pliable creasible sheet-like material, each strip having a length and a width transverse said length, each strip being anchored along said width at a predetermined position on said support and at a predetermined position on said member for suspending said member in an equilibrium position such that said strips are each planar when said member is in the equilibrium position, said material having the property that any tendency to elongate any of said strips provides a restoring stress in that strip, and, when fully extended, the extended length of said material exhibits negligible strain when the material is subjected to tensile stresses along said length so long as said tensile stresses are below the yield point of said material, said strips being arranged at an angle to said member and said supports such that said length of each strip extends from said member to said support in a direction having components solely in the same two directions of a three dimensional coordinate system and said width of each strip extends solely in the same third direction of said coordinate system resulting in equal and opposite restoring force components being applied by said strips to said member in at least said two directions in response to the application of a disturbing force or torque on said member tending to displace said member from said equilibrium position, the width of each strip being such that equal and opposite restoring force components are applied to said member in at least the remaining direction of the system in response to said disturbing force or torque.

2. The apparatus of claim 1 wherein said strips are each prestressed when said member is in said equilibrium position.

3. The apparatus of claim 1 wherein said strips are spatially arranged in geometric symmetry with respect to the suspended member, said strips having substantially the same modulus of elasticity, width, length and thickness, and being prestressed to substantially the same extent.

4. The apparatus of claim 1, wherein said strips are prestressed and spatially arranged in geometric assymmetry with respect to the suspended member, the modulus of elasticity, degree of prestress, width, length and thickness of each strip being predetermined to provide said effective force restoring symmetry.

5. The apparatus of claim 1 wherein said strips are prestressed, the prestress in each of said strips being different from the prestress in any of the other strips.

6. The apparatus of claim 1, wherein the width of at least one of said strips is different from the width of the remaining strips.

7. The apparatus of claim 1 wherein said predetermined anchorage positions on said support are coplanar.

8. The apparatus of claim 1 wherein said predetermined anchorage position in said support are disposed in different planes, the suspended member being disposed between the planes.

9. The apparatus of claim 1 wherein said support includes an annular ring.

10. The apparatus of claim 1 wherein said predetermined anchorage positions are parallel.

11. The apparatus of claim 1 wherein said plurality of strips includes eight strips, arranged in at least two spaced sets, the effective force restoring symmetry being a further function of the spaced arrangement of said sets.

12. The apparatus of claim 1 wherein said strips are trapezoidal.

13. The apparatus of claim 1 wherein said plurality of strips includes at least four strips.

14. An apparatus for suspending a rigid member between first and second supports comprising:

first and second non-parallel creasible, foldable sheet-like webs, each web having a length and a width transverse said length and connected between anchor positions on one of said supports and corresponding spaced anchor positions on said member, and third and fourth non-parallel creasible, foldable sheet-like webs, each web having a length and a width transverse said length connected between anchor positions on the other of said supports and corresponding spaced anchor positions on said member, said webs being spaced with respect to each other such that said length of each web extends from said member to the corresponding support in a direction having components solely in the same two directions of a three dimensional coordinate system and said width of each web extends solely in the same third direction of said coordinate system, said webs being made of material having the property that any tendency to elongate any of said webs provides a restoring stress in that web and, when fully extended, the extended length of said material exhibits negligible strain when the material is subjected to tensile stresses along said length so long as said tensile stresses are below the yield point of said material, said webs being spatially arranged such that equal and opposite restoring force components are applied by said webs to said member in at least said two directions in response to the application of a disturbing force or torque on said member tending to displace said member from an equilibrium position, said widths being such that equal and opposite restoring force components are applied to said member in at least the remaining direction of the system in response to said disturbing force or torque.

15. The apparatus of claim 14 wherein said first and second webs are anchored to substantially the same position on said one support, and said third and fourth webs are anchored to substantially the same position on said other support.

16. The apparatus of claim 14 wherein said first and second webs are anchored to spaced positions on said one support, and said third and fourth webs are anchored to spaced positions on said other support.

17. An apparatus for suspending a rigid member between first and second supports, comprising:

first and second spaced sets of creasible, foldable sheet-like webs, each web having a length and a width transverse said length, each set including:

first and second non-parallel webs connected between anchor positions on one of said supports and corresponding spaced anchor positions on said member, and third and fourth non-parallel webs connected between anchor positions on the other of said supports and corresponding anchor positions on said member, said webs being spaced with respect to each other such that said length of each web extends from said member to the corresponding support in a direction having components solely in the same two directions of a three dimensional coordinate system and said width of each web extends solely in the same third direction of said coordinate system, said webs being made of material having the property that any tendency to elongate any of said webs provides a restoring stress in that web and, when fully extended, the extended length of said material exhibits negligible strain when the material is subjected to tensile stresses along said length so long as said tensile stresses are below the yield point of said material.

18. The apparatus of claim 17 wherein a first selected one of said first and second webs and a first selected one of said third and fourth webs of each set cooperate to apply a torque to said member in a given direction about a first axis, the other of said first and second webs and the other of said third and fourth webs from said first selected ones cooperate to apply an equal and opposite torque to said member about said first axis, a second selected one of said first and second webs and a second selected one of said third and fourth webs cooperating to apply a torque to said member in a given direction about a second axis, the other of said first and second webs and the other of said third and fourth webs from said second selected ones cooperating to apply an equal and opposite torque to said member about said second axis, said first and second sets of webs being arranged such that two of the webs in one set cooperate with two of the webs in the other set to apply a torque in a given direction about a third axis and the other webs in said sets cooperate to apply an equal and opposite torque about said third axis, said first, second and third axes being mutually orthogonal, said webs each being prestressed and arranged at an angle to said member and said supports such that said prestressing results in the application of equal and opposite force components to said member in the direction of at least two of said axes, said webs each having a width such that said prestressing results in the application of equal and opposite force components to said member in the direction of the remaining axis, said applied torques maintaining said member in rotational equilibrium, said force components maintaining said member in translational equilibrium.

19. The apparatus of claim 17 wherein said anchor positions on said one support are disposed in spaced relation to each other, and said anchor position on said other support are disposed in spaced relation to each other.

20. The apparatus of claim 17 wherein said first and second webs define a first pair of planes intersecting along a first line between said member and said one support, said third and fourth webs define a second pair of planes intersecting between said member and said other support along a second line substantially parallel to said first line, said first and third webs being parallel and lying in different planes, said second and fourth webs being parallel and lying in different planes, said first and third webs being spaced from said second and fourth webs in the direction of said lines.

21. The apparatus of claim 20 wherein the first and third webs of said first set are substantially parallel to the first and third webs of said second set, the second and fourth webs of said first set are substantially parallel to the second and fourth webs of said second set, said sets being spaced with respect to each other in a direction parallel to said lines.

22. The apparatus of claim 20 wherein said (i) first and third webs and said (ii) second and fourth webs form pairs of webs so arranged that each of said pairs provides a torque couple about an axis parallel to said lines.

23. The apparatus of claim 20 wherein said lines of intersection each lie substantially midway between said member and the respective supports.

24. The apparatus of claim 20 wherein said webs are made of a polyimide plastic film, the angle of intersection of said planes being 45°.

25. An apparatus for suspending a rigid member between first and second supports comprising:

first and second non-parallel webs connected between anchor positions on one of said supports and corresponding spaced anchor positions on said member, third and fourth non-parallel webs connected between anchor positions on the other of said supports and corresponding spaced anchor positions on said member, said webs being spaced with respect to each other for supporting said member in an equilibrium position such that a restoring stress in at least one of said webs results when said member is angularly or translationally displaced in any direction from said equilibrium position, said webs being disposed in said spaced arrangement to establish substantially effective force restoring symmetry with respect to said suspended member, the force restoring effect of each web being the combined function of its width, modulus of elasticity, angular orientation relative to said other webs, and the degree of prestressing imposed on each of said webs, said webs being arranged at an angle to said member and said supports such that equal and opposite restoring force components are applied by said webs to said member in at least two of the directions of a three dimensional coordinate system in response to the application of a disturbing force or torque on said member tending to displace said member from said equilibrium position, said webs each having a width such that equal and opposite restoring force components are applied to said member in at least the remaining direction of the system in response to said disturbing force or torque.

26. The apparatus of claim 25 wherein said first and second webs are anchored to substantially the same position on said one support, and said third and fourth webs are anchored to substantially the same position on said other support.

27. The apparatus of claim 25 wherein said first and second webs are anchored to spaced positions on said one support, and said third and fourth webs are anchored to spaced positions on said other support.

28. An apparatus for suspending a rigid member between first and second supports, comprising:

first and second spaced sets of webs, each set including:

first and second non-parallel webs connected between anchor positions on one of said supports and corresponding spaced anchor positions on said member, third and fourth non-parallel webs connected between anchor positions on the other of said supports and corresponding anchor positions on said member, said webs being spaced with respect to each other for supporting said member in an equilibrium position such that a restoring stress in at least one of said webs results when said member is angularly or translationally displaced in any direction from said equilibrium position, said webs being disposed in said spatial arrangement to establish substantially effective force restoring symmetry with respect to said suspended member, the force restoring effect of each web being the combined function of its minimum width, modulus of elasticity, angular orientation relative to said other webs, and the degree of prestressing imposed on each of said webs, a first selected one of said first and second webs and a first selected one of said third and fourth webs of each set cooperate to apply a torque to said member in a given direction about a first axis, the other of said first and second webs and the other of said third and fourth webs from said first selected ones cooperate to apply an equal and opposite torque to said member about said first axis, a second selected one of said first and second webs and a second selected one of said third and fourth webs cooperating to apply a torque to said member in a given direction about a second axis, the other of said first and second webs and the other of said third and fourth webs from said second selected ones cooperating to apply an equal and opposite torque to said member about said second axis, said first and second sets of webs being arranged such that two of the webs in one set cooperate with two of the webs in the other set to apply a torque in a given direction about a third axis and the other webs in said sets cooperate to apply an equal and opposite torque about said third axis, said first, second and third axes being mutually orthogonal, said webs each being prestressed and arranged at an angle to said member and said supports such that said prestressing results in the application of equal and opposite force components to said member in the direction of at least two of said axes, said webs each having a width such that said prestressing results in the application of equal and opposite force components to said member in the direction of the remaining axis, said applied torques maintaining said member in rotational equilibrium, said force components maintaining said member in translational equilibrium.

* * * * *

UNITED STATES PATENT OFFICE
CERTIFICATE OF CORRECTION

Patent No. 3,727,865          Dated April 17, 1973

Inventor(s) David Robert Melrose and Derek Sidney Binge

It is certified that error appears in the above-identified patent and that said Letters Patent are hereby corrected as shown below:

Col. 1, line 37, after "thermal" insert -- insulating --,

Col. 7, line 56, "web 17" should be "web 14",

Col. 10, line 51, "webs 60-68" should be -- webs 60-67 --,

Col. 13, line 59, "x-6" should be -- x-y --,

Col. 14, line 44, "3.73" should be -- 3.72 --; col. 14, line 65, "10," should be -- 10g --.

Signed and sealed this 25th day of December 1973.

(SEAL)
Attest:

EDWARD M. FLETCHER, JR.
Attesting Officer

RENE D. TEGTMEYER
Acting Commissioner of Patents